(12) United States Patent
Nash

(10) Patent No.: US 8,539,924 B2
(45) Date of Patent: Sep. 24, 2013

(54) TELESCOPIC INTAKE RUNNER SYSTEM

(76) Inventor: Timothy B. Nash, Inverness, FL (US)

( * ) Notice: Subject to any disclaimer, the term of this patent is extended or adjusted under 35 U.S.C. 154(b) by 373 days.

(21) Appl. No.: 12/967,584

(22) Filed: Dec. 14, 2010

(65) Prior Publication Data

US 2011/0139109 A1 Jun. 16, 2011

Related U.S. Application Data

(60) Provisional application No. 61/286,489, filed on Dec. 15, 2009.

(51) Int. Cl.
*F02M 35/10* (2006.01)

(52) U.S. Cl.
USPC ................... 123/184.55; 123/184.53

(58) Field of Classification Search
USPC ...................................... 123/184.55
See application file for complete search history.

(56) References Cited

U.S. PATENT DOCUMENTS 6,539,923 B1 * 4/2003 Mengoli ................. 123/184.55
2009/0165741 A1 * 7/2009 Kubo et al. ............. 123/184.55

* cited by examiner

*Primary Examiner* — Noah Kamen
(74) *Attorney, Agent, or Firm* — Antonio Papageorgiou; Ostrow Kaufman LLP

(57) ABSTRACT

In one embodiment, a telescopic intake runner system is provided that includes a first tubular section; a second tubular section coaxially located within the first tubular section and movable relative to the first tubular section along the axis thereof; at least one motor coupled to at least one of the first and the second tubular section; at least one sensor; and a controller coupled to the sensor and to the at least one motor. The controller is operable in this instance to receive an input signal from the at least one sensor and to communicate a control signal to the at least one motor to increase or decrease an overall length of the first and second tubular sections based on the signal from the at least one sensor. The telescopic instance runner system is installed upstream from a throttle body of an engine.

10 Claims, 2 Drawing Sheets

TELESCOPIC INTAKE RUNNER SYSTEM

CLAIM OF PRIORITY

This application claims the benefit of U.S. Provisional Application No. 61/286,489, filed Dec. 15, 2009, which is incorporated herein by reference.

BACKGROUND OF THE INVENTION

The present application relates to intake systems and more particularly intake systems with variable geometry for internal combustion engines.

Various intake systems have been used with internal combustion engines. These designs, however, are a typically limited by the intended use of the engine. For example, engines intended for daily driven automobiles have intakes that favor low speed operation whereas intakes for race vehicles typically favor high speed operation. Variable geometry intake systems have been proposed, however, these designs appear complex and thus expensive to produce. Additionally, the variable geometry portion of these systems seems to be incorporated into the intake manifold beyond the throttle body, which makes these systems impossible to retrofit on engines that the manifolds were not designed for.

Accordingly, there is a need for variable geometry intake systems that are simpler to produce and that are easily retrofitted on existing engines.

SUMMARY OF THE INVENTION

In one embodiment, a telescopic intake runner system is provided that includes a first tubular section; a second tubular section coaxially located within the first tubular section and movable relative to the first tubular section along the axis thereof; at least one motor coupled to at least one of the first and the second tubular section; at least one sensor; and a controller coupled to the sensor and to the at least one motor. The controller is operable in this instance to receive an input signal from the at least one sensor and to communicate a control signal to the at least one motor to increase or decrease an overall length of the first and second tubular sections based on the signal from the at least one sensor. The telescopic instance runner system is installed upstream from a throttle body of an engine.

In at least one embodiment, the at least one motor is a linear motor.

In at least one embodiment, the overall length of the first and second tubular sections varies based on at least engine speed, the controller increases the overall length of the first and second tubular sections as engine speed decreases and decreases the overall length of the first and second tubular sections as engine speed increases.

In at least one embodiment, the controller varies the overall length of the first and second tubular sections to capture at least a first sonic wave associated with a piston of the engine.

In at least one embodiment, controller varies the overall length of the first and second tubular sections to capture at least a third or a fourth sonic wave associated with a piston of the engine.

In at least one embodiment, at lower speed the controller varies the overall length of the first and second tubular sections to capture an earlier sonic wave associated with a piston of the engine.

In at least one embodiment, at higher speed the controller varies the overall length of the first and second tubular sections to capture a later sonic wave associated with a piston of the engine.

In at least one embodiment, the controller, the at least one motor, and the tubular sections are integrated in a unit.

In at least one embodiment, the sensor is further integrated into the unit, the sensor operable to observe pressure pulses passing through the tubular sections, the controller operable to vary the overall length of the first and the second tubular sections based on the pressure pulses passing through the tubular sections.

In at least one embodiment, the unit provided as a bolt on kit requiring only a power connection to a vehicle.

In at least one embodiment, a telescopic intake runner system is provide that includes a first tubular section; a second tubular section coaxially located within the first tubular section and movable relative to the first tubular section along the axis thereof; at least one linear motor coupled to at least one of the first and the second tubular section; at least one sensor that senses varying engine speed of an engine; and a controller coupled to the sensor and to the at least one motor. In this instance the controller is operable to receive an input signal from the at least one sensor and to communicate a control signal to the at least one motor to increase or decrease an overall length of the first and second tubular sections based on the engine speed signal from the at least one sensor. The controller increases the overall length of the first and second tubular sections as engine speed decreases and decreases the overall length of the first and second tubular sections as engine speed increases, at lower speed the controller varies the overall length of the first and second tubular sections to capture an earlier sonic wave associated with the engine, and at higher speed the controller varies the overall length of the first and second tubular sections to capture a later sonic wave associated with the engine. The telescopic instance runner system is installed upstream from a throttle body of the engine.

DETAILED DESCRIPTION OF THE INVENTION

This invention relates to a telescopic intake runner system with an integrated linear motor structure and control system for an internal combustion engine. The intake runner system may be used in naturally aspirated engines or force fed engines, including the systems for force feeding disclosed in U.S. Pat. No. 5,048,470, which is hereby incorporated herein by reference.

Figure 1:
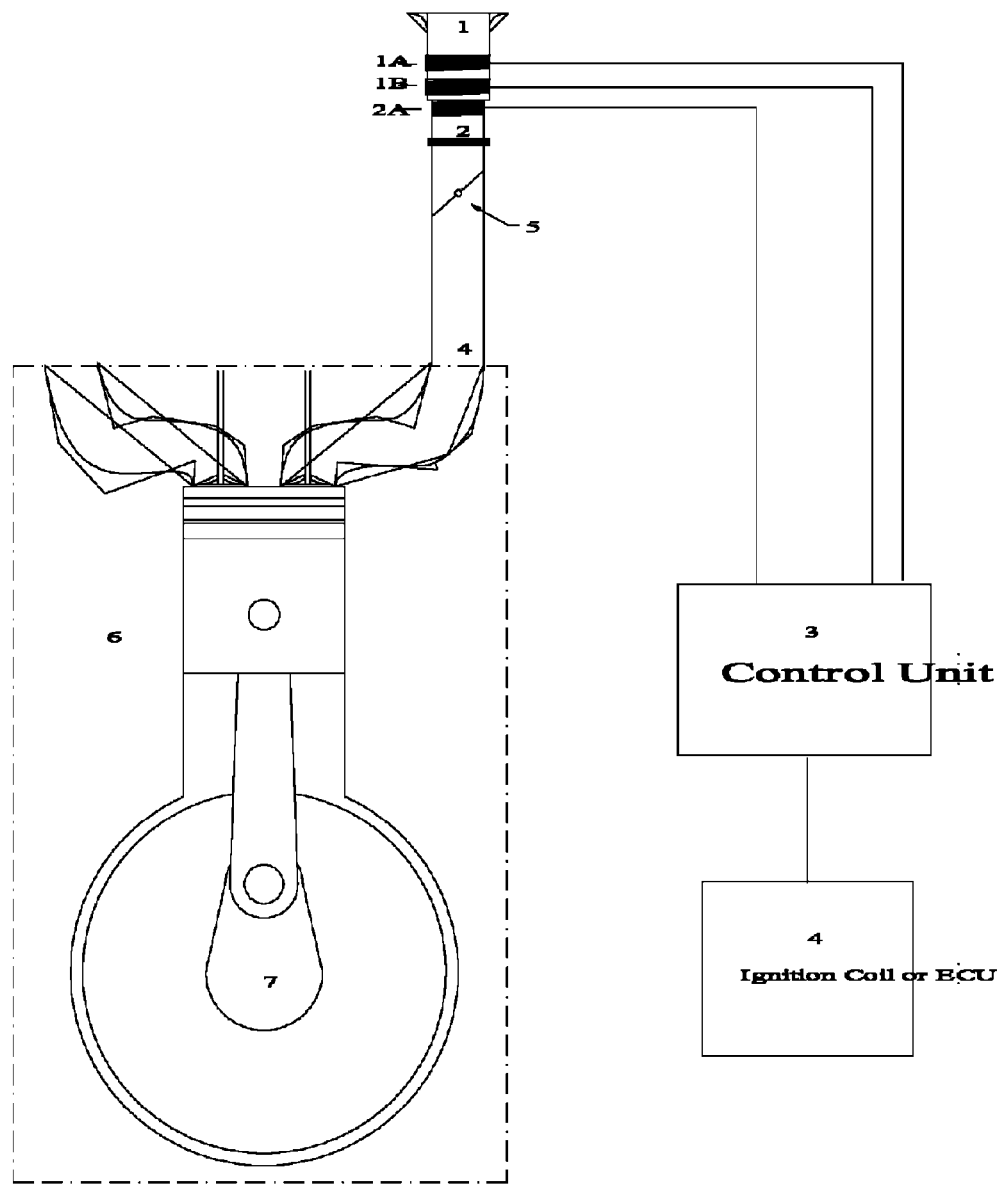
FIG. 1 is a diagram of an internal combustion engine with variable intake runners according to at least one embodiment of the systems disclosed herein.

As illustrated in FIG. 1, the intake system according to at least one embodiment of the systems disclosed herein includes an intake runner that consists of two or more tubular sections (1 and 2) with electromagnetic motor structures (1A, 1B and 2A) integrated in their construction. Motor structures (1A) and (1B) are shown as segmented for increased position accuracy. That is, the base motor structure (2A) may be electrically energized and the motor structures (1A) and (1B) may also be electrically energized and polarized in a manner as to control, i.e., increase and/or decrease, of the overall length of the telescopic velocity stack (1 and 2) thereby adjusting the intake tract length (4).

The track length (4) is preferably controlled by an electronic control unit (3) to achieve an optimum or otherwise desired track length. Additional motor structures can be added to the base (2) and/or additional telescopic segments with integrated motor structure segments can be added to achieve a desired overall track length and a desired variability thereof. The end most telescopic section (1) may also incorporate bell curve similar to that of a trumpet.

In at least one embodiment, the overall track length and number of segments in the intake runner is determined by the requirement of the sonic wave produced from the combustion engines (6) design. That is, the sonic wave produced will vary based on the specification of the engine, including the number of cylinders, displacement, cylinder bore vs. stroke, camshaft intake duration and timing profiles, valve train geometry, valve numbers and size, intake runner diameter, engine RPM, etc. In at least one embodiment, the length is further determined based on piston speed as the piston develops a sonic wave. Therefore, in this instance, the length is further based on the number of the sonic wave that the system is trying to capture. Trying to capture the first sonic wave, in some engines, would require intake runners to be several feet long. Capturing, without limitation, the 3rd and 4th wave would require a shorter length. In this respect, the track length may vary anywhere from about 1 inch to several feet, or any increment in between.

In at least one embodiment, the length of the runner may vary based on at least one operating parameter associated with the engine. That is, the control unit (3) may have the ability to accept in input signal from any engine component and translate that input signal into an output signal that varies the length of the intake runner In at least one embodiment, the control unit (3) receives an engine timing signal from, e.g., a coil, the ECU (4), a crankshaft sensor, etc., and interprets the crankshaft (7) revolutions per minute (rpm) of the engine (6) to vary the position the velocity stack (1) to achieve the desired track length. The length may be varied any desired amount, including from about +/−0.1 inch to about 2 inches or to several feet, in any increment in between, in steps or otherwise, especially if the system is set up to capture a different number of the sonic waves at different engine RMPs. This will tune the overall length of the intake track (4) as to create an inertia supercharging effect.

Figure 2:
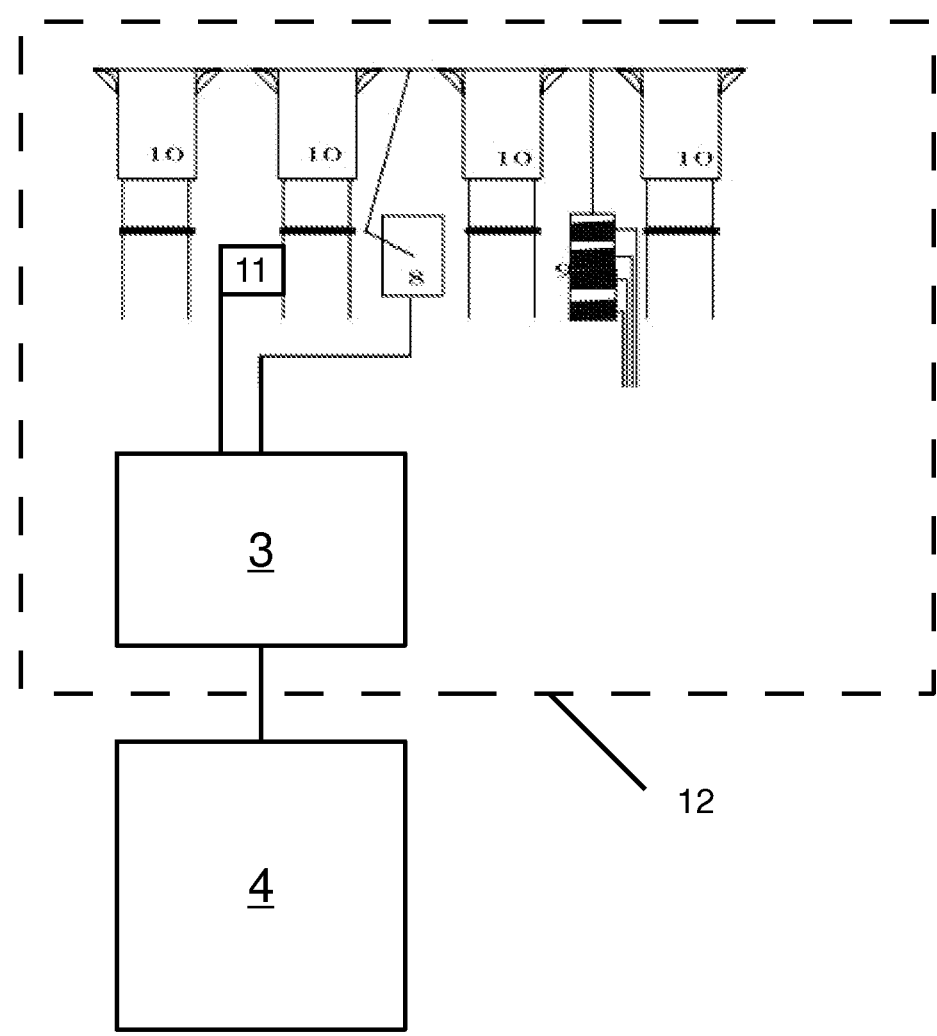
FIG. 2 is a diagram of an intake for an internal combustion engine with variable intake runners according to at least one embodiment of the systems disclosed herein.

This adjustment preferably occurs prior to or upstream from the throttle valve (5). In operation, at low engine (6) rpm, motor structures (2A) and (1B) will be energized in a fashion to fully extend the velocity stack. As the engines rpm's increase, the control unit (3) will interpret the increased RPM and at a pre-programmed rpm level, reverse the polarity of motor structure (1B). As the engines rpm's increases higher, control unit (3) will de-energize motor structure (1B) and energize motor structure (1A) in the proper polarity to position the velocity stack at the top of motor structure (2A). Finally as the engines rpm increases further, the control unit will reverse the polarity of motor structure (1A) so the velocity stack comprised of (1) and (2) will be at its shortest length. If the engine (6) has a wide operating range, the operating rage of the engine can be divided into harmonics. This system can be re-extended to operate in the same fashion and maximize the inertia supercharging effect of the next harmonic. Dimples reminiscent of the ones found on golf balls can be arranged around the inlet of the velocity stack (1) to reduce resistance that occurs at the bell curve thereby increasing air volume and speed. As illustrated in FIG. 2, a plurality of these sections (10) can be moved in concert via a single linear motor (9) or one stepper motor (8).

Although the track length of the intake runner system is described as being varied with a particular motor structure, it is understood that various other motors may be used to achieve the variable length velocity stack as discussed herein. For example, rather than using dual opposing coils, fast acting linear motors may be integrated into the telescopic velocity stacks, as well as linear stepper motors with a flat platen, moving magnet motors, piezo electric linear motors, etc.

Due to the designs of various OEM intakes, it may be necessary to use three or more telescopic sections to produce the desired result. For example, used in a motorcycle, such as the V-Max, there is plenty of room to make good power at 5,000 rpm with about a 5" long velocity stack. When the engine gets to 9,500 RPM, however, the stacks nest down to about 2". This may be achieved via 3 telescopic sections. For control of this system, two motor structures may be used. Disparate types of motor structures may also be used, for example, one that provides finer or incrementally small movement control for operation at a certain RPM range and another that provides courser or incrementally larger movement control at another RPM range. For instance, the plurality of motors may be controlled to operate in a successive fashion, i.e., one motor extends a section entirely before another of the motors begins to extend another of the telescopic sections. Similarly, the motors may operate in tandem to provide the desired movement and also the desired rate of extension so as to be sufficiently responsive to the change in the motor's RMP. For instance, a course adjustment may be applied to increase the length of the telescopic sections 2" relatively quickly while another of the motors provides finer adjustment to increase the length an additional ¼". In one embodiment, a flat platen motor may be used to control the fine position and a strong solenoid type motor to add 2 inches to the length. The flat platen section is moved by the solenoid section. In another embodiment, a moving magnet design may be used where the end section has two coils that traveled along two posts comprised of stacked neodium magnets. The pole extends about 3 inches above the assembly when it is nested.

Additionally, the velocity stacks positional control circuit may be integrated into the velocity stack. That is, the controller may be an integrated part of the velocity stack. As part of this integration 12, a pressure sensor 11 may be used to observe the intake tract pulses that pass thru the velocity stack. The vacuum/pressure pulse signal may then be provided to the control circuit to control the length of the velocity stack. That is, the control circuit will receive the vacuum signal from the pressure sensor and from the timing of these pulses, the control circuit will calculate the engines speed. This allows the velocity stacks to be packaged as a bolt on kit with only two wires extending therefrom to power the device.

While the foregoing invention has been described in some detail for purposes of clarity and understanding, it will be appreciated by one skilled in the art, from a reading of the disclosure that various changes in form and detail can be made without departing from the true scope of the invention in the appended claims.

What is claimed is:

1. A telescopic intake runner system comprising:
   a first tubular section;
   a second tubular section coaxially located within the first tubular section and movable relative to the first tubular section along the axis thereof;
   at least one motor coupled to at least one of the first and the second tubular section;
   at least one sensor; and
   a controller coupled to the sensor and to the at least one motor, the controller operable to receive an input signal from the at least one sensor and to communicate a control signal to the at least one motor to increase or decrease an overall length of the first and second tubular sections based on the signal from the at least one sensor, wherein the telescopic instance runner system is installed upstream from a throttle body of an engine, wherein the controller, the at least one motor, the at least one sensor, and the tubular sections are integrated in a unit, and wherein the sensor operable to observe pressure pulses passing through the tubular sections, the controller operable to vary the overall length of the first and the second tubular sections based on the pressure pulses passing through the tubular sections.

2. The system of claim 1, wherein the at least one motor is a linear motor.

3. The system of claim 1, wherein the overall length of the first and second tubular sections varies based on at least engine speed, the controller increasing the overall length of the first and second tubular sections as engine speed decreases and decreasing the overall length of the first and second tubular sections as engine speed increases.

4. The system of claim 3, wherein the controller varies the overall length of the first and second tubular sections to capture at least a first sonic wave associated with a piston of the engine.

5. The system of claims 3, wherein the controller varies the overall length of the first and second tubular sections to capture at least a third or a fourth sonic wave associated with a piston of the engine.

6. The system of claim 3, wherein at lower speed the controller varies the overall length of the first and second tubular sections to capture an earlier sonic wave associated with a piston of the engine.

7. The system of claims 6, wherein at higher speed the controller varies the overall length of the first and second tubular sections to capture a later sonic wave associated with a piston of the engine.

8. The system of claim 1, the unit provided as a bolt on kit requiring only a power connection to a vehicle.

9. A telescopic intake runner system comprising:
a first tubular section;
a second tubular section coaxially located within the first tubular section and movable relative to the first tubular section along the axis thereof;
at least one linear motor coupled to at least one of the first and the second tubular section;
at least one sensor that senses varying engine speed of an engine; and
a controller coupled to the sensor and to the at least one motor, the controller operable to receive an input signal from the at least one sensor and to communicate a control signal to the at least one motor to increase or decrease an overall length of the first and second tubular sections based on the engine speed signal from the at least one sensor, wherein the sensor is operable to observe pressure pulses passing through the tubular sections, the controller operable to vary the overall length of the first and the second tubular sections based on the pressure pulses passing through the tubular sections, and wherein the controller increases the overall length of the first and second tubular sections as engine speed decreases and decreases the overall length of the first and second tubular sections as engine speed increases, at lower speed the controller varies the overall length of the first and second tubular sections to capture an earlier sonic wave associated with a piston of the engine, and at higher speed the controller varies the overall length of the first and second tubular sections to capture a later sonic wave associated with the piston of the engine, wherein the telescopic instance runner system is installed upstream from a throttle body of the engine.

10. A telescopic intake runner system comprising:
a first tubular section;
a second tubular section coaxially located within the first tubular section and movable relative to the first tubular section along the axis thereof;
at least one motor coupled to at least one of the first and the second tubular section;
at least one sensor; and
a controller coupled to the sensor and to the at least one motor, the controller operable to receive an input signal from the at least one sensor and to communicate a control signal to the at least one motor to increase or decrease an overall length of the first and second tubular sections based on the signal from the at least one sensor, wherein the telescopic instance runner system is installed upstream from a throttle body of an engine, wherein the sensor operable to observe pressure pulses passing through the tubular sections, the controller operable to vary the overall length of the first and the second tubular sections based on the pressure pulses passing through the tubular sections.

\* \* \* \* \*